United States Patent
Kuroyanagi et al.

(10) Patent No.: US 8,485,275 B2
(45) Date of Patent: Jul. 16, 2013

(54) POWER TOOL

(75) Inventors: Takao Kuroyanagi, Anjo (JP); Hideki Abe, Anjo (JP)

(73) Assignee: Makita Corporation, Anjo-shi (JP)

( * ) Notice: Subject to any disclaimer, the term of this patent is extended or adjusted under 35 U.S.C. 154(b) by 898 days.

(21) Appl. No.: 12/010,171

(22) Filed: Jan. 22, 2008

(65) Prior Publication Data
US 2008/0173459 A1   Jul. 24, 2008

(30) Foreign Application Priority Data
Jan. 22, 2007 (JP) ................................ 2007-010992

(51) Int. Cl.
B23B 47/14 (2006.01)

(52) U.S. Cl.
USPC .......................................... 173/216; 173/217

(58) Field of Classification Search
USPC ................................................ 173/216, 217
See application file for complete search history.

(56) References Cited

U.S. PATENT DOCUMENTS

| | | | |
|---|---|---|---|
| 4,709,594 A | 12/1987 | Maeda | |
| 4,791,833 A | 12/1988 | Sakai et al. | |
| 4,926,713 A | 5/1990 | Madill | |
| 5,339,908 A | 8/1994 | Yokota et al. | |
| 5,550,416 A | 8/1996 | Fanchang et al. | |
| 6,070,675 A | 6/2000 | Mayer et al. | |
| 6,142,242 A | 11/2000 | Okumura et al. | |
| 6,213,224 B1 | 4/2001 | Furuta et al. | |
| 6,422,969 B1 | 7/2002 | Raghavan et al. | |
| 6,431,289 B1 | 8/2002 | Potter et al. | |
| 6,599,219 B2 | 7/2003 | Pan | |
| 6,655,470 B1 | 12/2003 | Chen | |
| 6,676,557 B2 | 1/2004 | Milbourne et al. | |
| 6,796,921 B1 * | 9/2004 | Buck et al. ...................... | 475/299 |
| 6,984,188 B2 * | 1/2006 | Potter et al. .................... | 475/298 |
| 7,008,151 B2 | 3/2006 | Yaksich et al. | |
| 7,121,361 B2 * | 10/2006 | Hara et al. ...................... | 173/176 |

FOREIGN PATENT DOCUMENTS

| | | |
|---|---|---|
| DE | 199 00 766 A1 | 7/1999 |
| EP | 1 445 074 A1 | 8/2004 |
| GB | 2 396 390 A | 6/2004 |
| JP | A-62-224584 | 10/1987 |
| JP | A-2004-237422 | 8/2004 |

* cited by examiner

Primary Examiner — Hemant M Desai
Assistant Examiner — Gloria R Weeks
(74) Attorney, Agent, or Firm — Oliff & Berridge, PLC

(57) ABSTRACT

A technique that increases operability in changing the rotational speed of a spindle in a power tool. The rotational speed can be changed in three levels by utilizing a planetary gear mechanism. The third gear position is located in an intermediate position in the sliding direction of the speed changing part. The first speed change position is located on one side of the third speed change position. The second speed change position is located on the other side of the third speed change position. During operation, shifting between the first and third speeds can be done without going through the second speed each time. Further, shifting between the second and third speeds can be done without going through the first speed. Therefore, speed change shifting can be facilitated.

5 Claims, 4 Drawing Sheets

POWER TOOL

BACKGROUND OF THE INVENTION

1. Field of the Invention

The present invention relates to a power tool such as an electric driver and an electric driver drill in which a rotational speed of a spindle can be changed in three levels by utilizing a planetary gear mechanism.

2. Description of the Related Art

An electric driver drill is known in which the rotational speed of a spindle can be changed in three levels, or a predetermined first speed (hereinafter refers to as "low speed"), a second speed fester than the first speed (hereinafter refers to as "medium speed") and a third speed faster than the second speed (hereinafter refers to as "high speed"). In this electric driver drill, a plurality of planetary gear mechanisms are disposed in series in the axial direction between an output shaft of a motor that is housed within a housing and a spindle that is disposed in a tip end region (front end region) of the housing. Further, die planetary gear mechanisms are constructed such that a plurality of planetary gears revolve on a sun gear while rotating within an internal gear. Such a driver drill is disclosed, for example, in Japanese laid-open patent publication No. 2004-237422.

The known driver drill has a speed changing part that can be linearly slid in the axial direction by a user from the outside of the housing. When the speed changing part is slid such that one of the two front and rear internal gears in the axial direction is locked to the housing and thus prevented from rotation, the spindle rotates at low speed. When the speed changing part is slid such that the other of the two internal gears is locked to the housing and thus prevented from rotation, the spindle rotates at medium speed. When the speed changing part is slid such that either one of the two internal gears is connected to a carrier while both of the internal gears arc allowed to rotate, the spindle rotates at high speed.

In order to realize reduction in size of the driver drill, it is preferable that the outside diameter of the internal gear is minimized. In other words, in order to meet such a demand for reduction in size of the driver drill, a constraint is imposed that the outside diameter of the internal gear cannot be increased. Under such a constraint, it is difficult to widen the difference between the speed reduction ratio of one planetary gear mechanism and the speed reduction ratio of the other planetary gear mechanism. As a result, it is rendered difficult to widen the difference m speed of the spindle between during rotation at low speed in which either one of the internal gears is locked to the housing and prevented from rotating, and during rotation at medium speed in which the other internal gear is locked to the housing and prevented from rotating. Therefore, in actual screw-tightening operation by using a driver drill, the frequency of shifting from low speed to medium speed or from medium speed to low speed is extremely lower than the frequency of shifting from low speed to high speed or from medium speed to high speed.

However, in the known driver drill, when the speed changing part is operated to change the rotational speed of the spindle, the speed changing part is shifted from low speed to medium speed and then to high speed, and vice versa. Therefore, in order to change from low speed to high speed or from high speed to low speed, the rotational speed of the spindle must be once changed to medium speed. Therefore, such an operation is troublesome, and further improvement is desired in this respect.

SUMMARY OF THE INVENTION

Accordingly, it is an object of the present invention to provide a technique that contributes to increased operability in changing the rotational speed of a spindle in a power tool in which the rotational speed of the spindle can be changed in three levels by utilizing a planetary gear mechanism.

The above-described object is achieved by the claimed invention. According to the claimed invention, a representative power tool is provided to include a motor that is housed within a tool body, a spindle that is rotatably disposed in a front end region of the tool body, and a speed changing mechanism that is disposed between an output shaft of the motor and the spindle. The speed changing mechanism serves to change the rotational speed of the output shaft and transmits the rotational speed to the spindle. Further, the speed changing mechanism includes first and second gear trains and a carrier. The first and second gear trains each have one set of a sun gear that is rotated by the output shaft, a planetary gear that engages with the sun gear and can revolve while rotating, and an internal gear that engages with the planetary gear and can rotate on the sun gear. The carrier is connected to the spindle and rotatably supports the first planetary gear of the first gear train and the second planetary gear of the second gear train. The "power tool" according to this invention typically represents an electric driver used for screw tightening operation, a driver drill used for screw tightening operation and drilling operation or an electric drill used for drilling operation. However, it also widely includes other power tools which perform a predetermined operation by rotating a tool bid about its axis. Further, the manner in which the sun gear is "rotated by the output shaft" according to the present invention suitably includes both the manner in which the sun gear is directly rotated by the output shaft and the manner in which the sun gear is rotated via an intermediate rotating member. Further, the manner in which the carrier is "connected to the spindle" suitably includes both the manner in which the carrier is directly connected to the spindle and the manner in which the carrier is indirectly connected via an intermediate member.

The power tool of the present invention has a speed changing part that is slid in the longitudinal direction of the tool body by a user from the outside of the tool body. Further, the manner in which the speed changing part is slid "by a user" suitably includes both the manner in which the speed changing part is directly slid by the user, and the manner in which the speed changing part is slid when the user operates another member. In the manner in which the user operates another member, the user can operate the member in an appropriately selected direction. Further, the "longitudinal direction of the tool body" represents the direction in which the first and second gear trains are arranged in series.

The speed changing part can move among first to third speed change positions. In the first speed change position, the speed changing part locks the first internal gear of the first gear train to the tool body and thus prevents the first internal gear from rotating, while allowing the second internal gear of the second gear train to rotate without tacking the second internal gear to the tool body. In the second speed change position, the speed changing part locks the second internal gear to the tool body and thus prevents the second internal gear from rotating, white allowing the first internal gear to rotate without locking the first internal gear to the tool body. In the third speed change position, the speed changing part connects the first and second internal gears together and allows the first and second internal gears to rotate together without locking the first and second internal gears to the tool body. When the speed changing part is placed in the first speed change position, the carrier is rotated at a predetermined first speed which is defined by a speed reduction ratio of the first gear train. When the speed changing part is placed in the second speed change position, the carrier is rotated at a predetermined second speed which is defined by a speed reduction ratio of the second gear train and is faster than the first speed. When the speed changing part is placed in the third speed change position, the carrier is rotated together with the first and second sun gears at a predetermined third speed faster than the second speed. Further, the first speed change position is located on one end side in the sliding direction of the speed changing part, the second speed change position is located on the other end side, and the third speed change position is located in an intermediate position between the first and second speed change positions.

According to the invention, the rotational speed of the carrier or the rotational speed of the spindle can be changed in three levels, or the first speed, the second speed faster than the first speed and the third speed faster than the second speed, by sliding the speed changing part among the first, second and third speed change positions. In a construction in which the rotational speed of the spindle is changed in three levels by using a plurality of planetary gear mechanisms, it is desired to minimize the outside diameter of the internal gear in order to realize reduction in size of the power tool. In order to meet such a demand, it is difficult to widen the difference between the speed reduction ratio of one planetary gear mechanism and the speed reduction ratio of the other planetary gear mechanism. Therefore, it is difficult to provide a large difference between the speed of rotation at the first speed and the speed of rotation at the second speed. On the other band, it is easy to provide a large difference between the speed of rotation at the second speed and the speed of rotation at the third speed. Therefore, in actual operation by using the power tool, the frequency of shifting from the first speed to the second speed or from the second speed to the first speed in which the speed difference is small is extremely lower than the frequency of shifting from the first speed to the third speed or from the second speed to the third speed in which the speed difference is large.

According to the invention, the third gear position in which the spindle is rotated at the third speed is located in an intermediate position in the sliding direction of the speed changing part The first speed change position in which the spindle is rotated at the first speed is located on one side of the third speed change position, and the second speed change position in which the spindle is rotated at the second speed is located on the other side of the third speed change position. Therefore, during processing operation by using the power tool, shifting operation between the first and third speeds which is frequently performed can be done without the need to go through the second speed area each time. Further, shifting operation between the second and third speeds which is also frequently performed can be done without the need to go through the first speed area. Therefore, shifting operation for speed change can be facilitated, so that ease of use can be unproved.

As one aspect of the invention, the rotational speed of the carrier may preferably be set such that the speed difference between the first and second speeds is smaller than the speed difference between the second and third speeds. With this construction, the difference between the speed reduction ratio of the first gear train which is used to obtain the first speed and the speed reduction ratio of the second gear train which is used to obtain the second speed can be reduced. In other words, the outside diameter of the internal gear forming the planetary gear mechanism can be reduced. As a result, the outside dimensions of the tool body that houses the planetary gear mechanism can be reduced, so that the size of the power tool can be reduced.

Further, according to the invention, speed changing part may include a sliding member that is disposed on the outside of the tool body and can be slid by the user, and a switching member that is disposed on the outside of the first and second internal gears in such a manner as to be rotatable and movable in the axial direction, the switching member being connected to the sliding member such that the switching member is allowed to move in the circumferential direction with respect to the sliding member and prevented from moving in the axial direction with respect to the sliding member, and engagement portions are provided on both end portions of the switching member in the direction of travel and can engage with the tool body, and one or the other of the engagement portions engages with the tool body, thereby preventing the first internal gear or the second internal gear from rotating, and the switching member is connected to the sliding member at a connecting point formed in an intermediate position of the switching member in the direction of travel.

According to this aspect of the invention, with the construction in which the engagement portions are provided on both end portions of the switching member in the direction of travel and engage with the tool body, thereby preventing the first internal gear or the second internal gear from rotating, the switching member can be connected to the sliding member at a connecting point formed in the intermediate position of the switching member in the direction of travel With this construction, shifting operation can be smoothly performed without strongly pushing the switching member.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
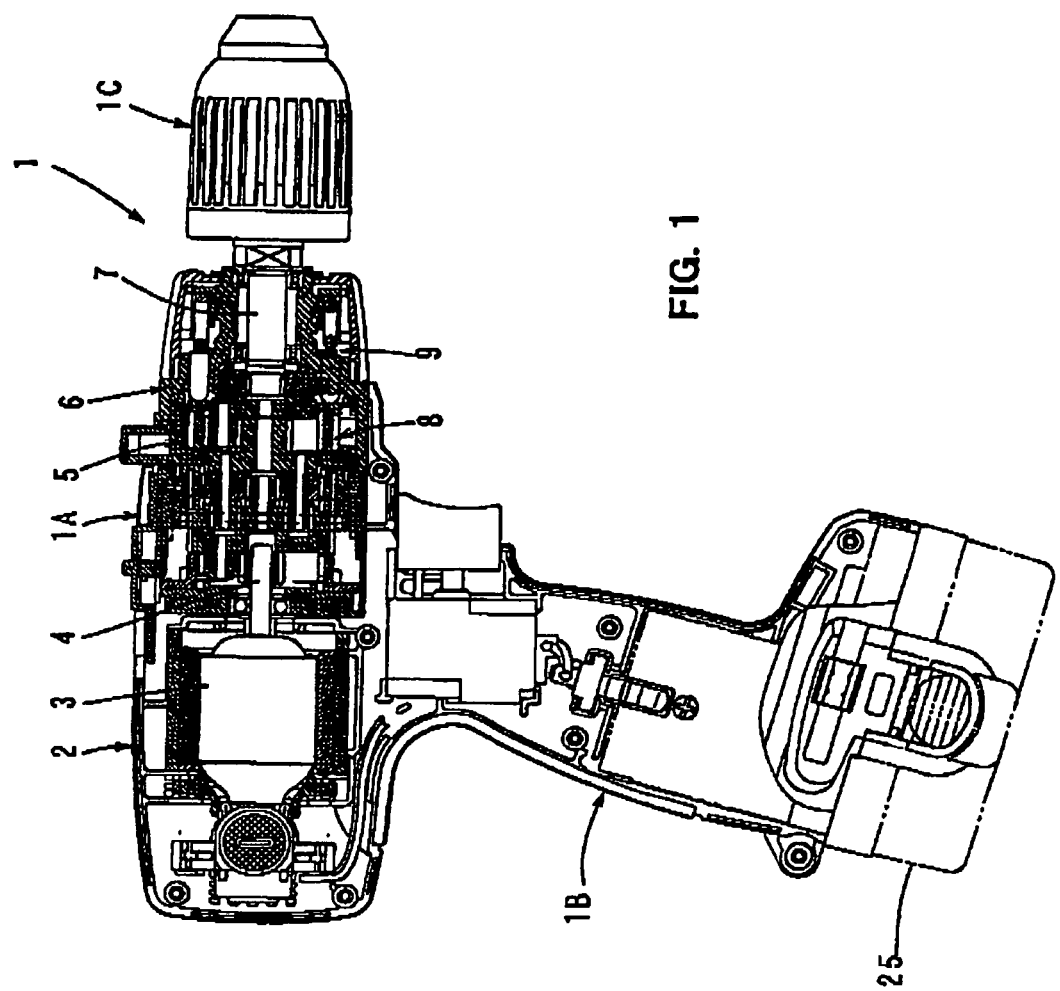
FIG. 1 is a sectional side view schematically showing an entire driver drill according to this embodiment
Figure 2:
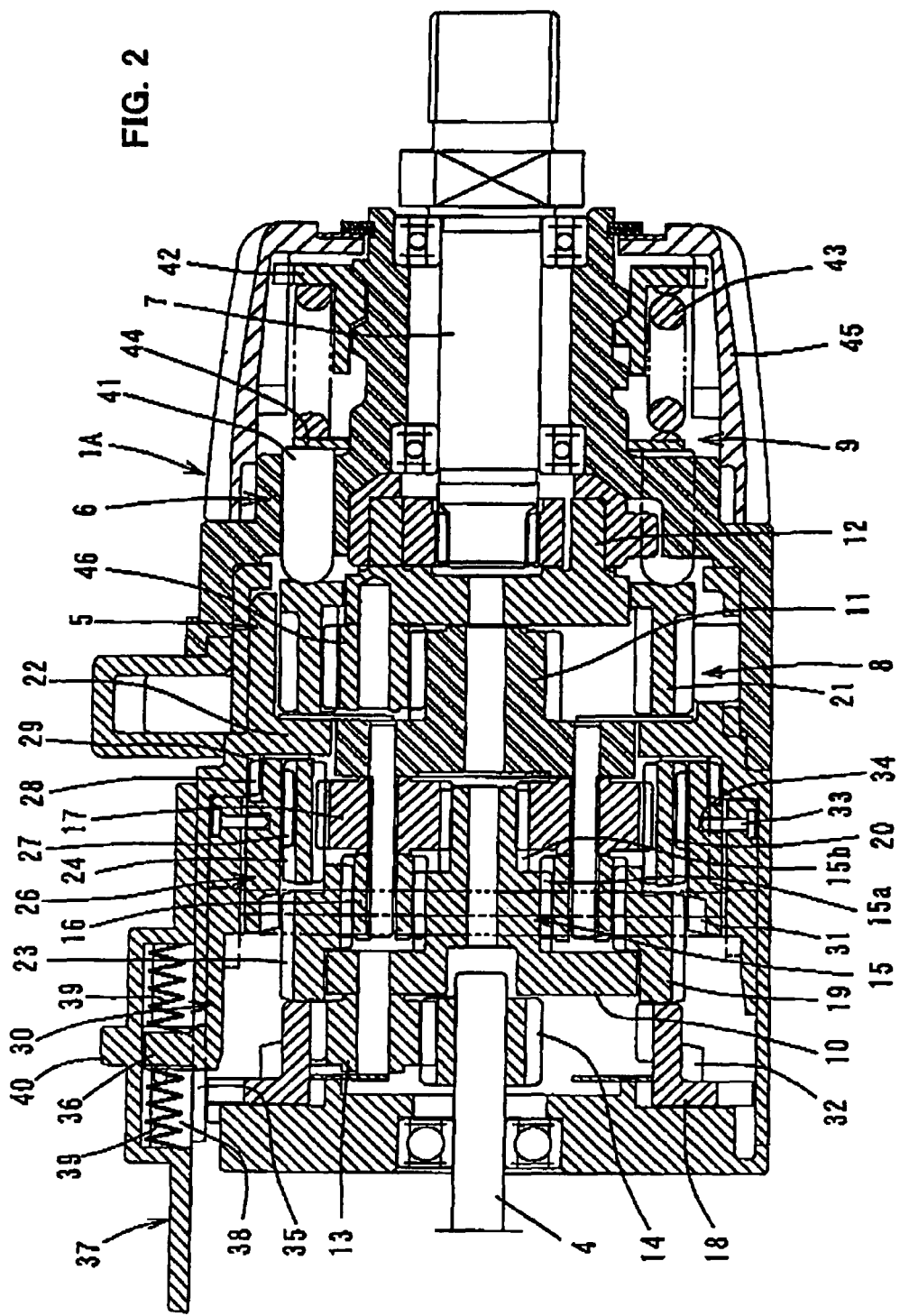
FIG. 2 is a sectional view showing an essential part of the driver drill in the state in which a planetary gear reducing mechanism is shifted to first gear (low speed).
Figure 3:
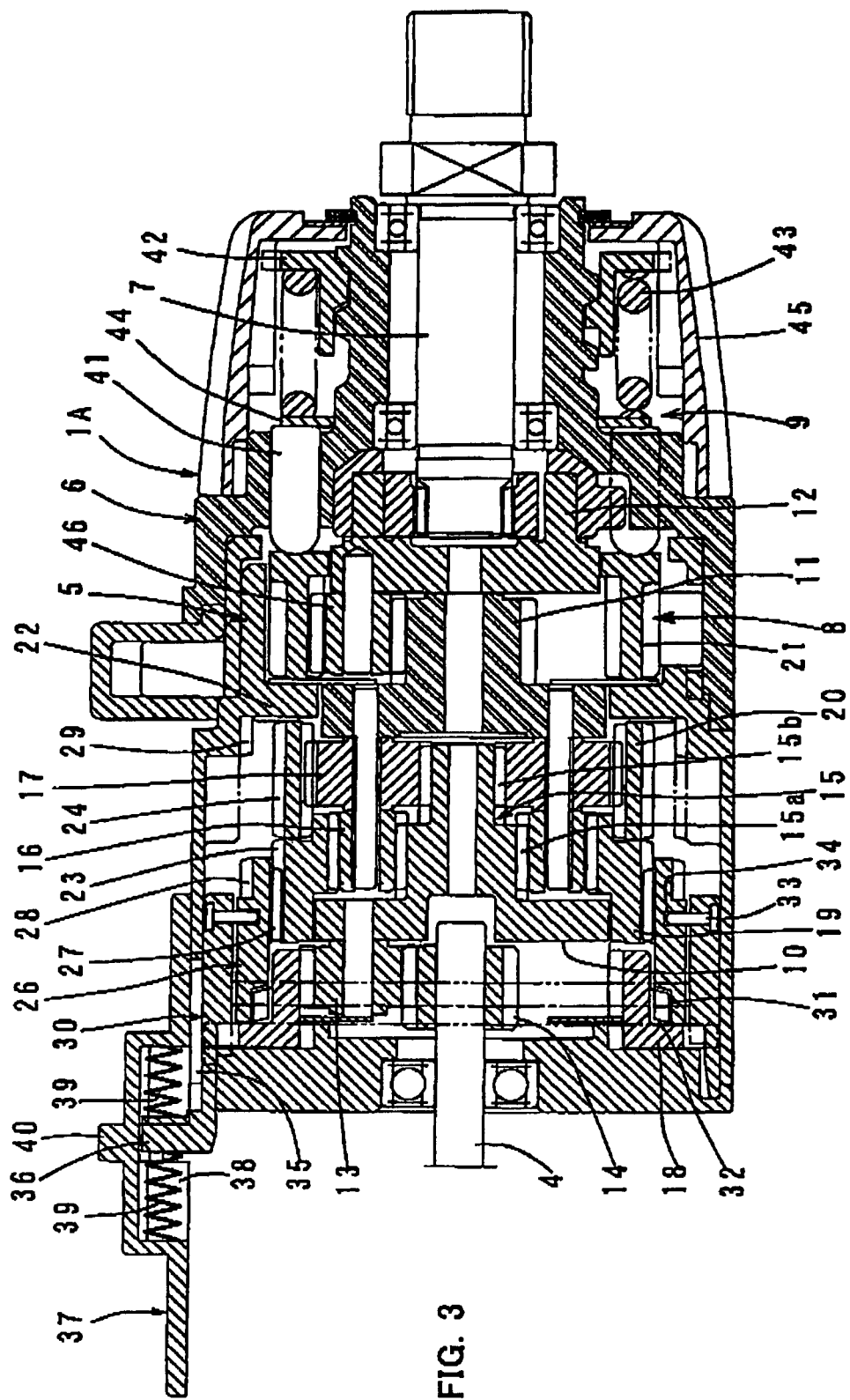
FIG. 3 is a sectional view showing the essential part of the driver drill in the state in which the planetary gear reducing mechanism is shifted to second gear (medium speed).
Figure 4:
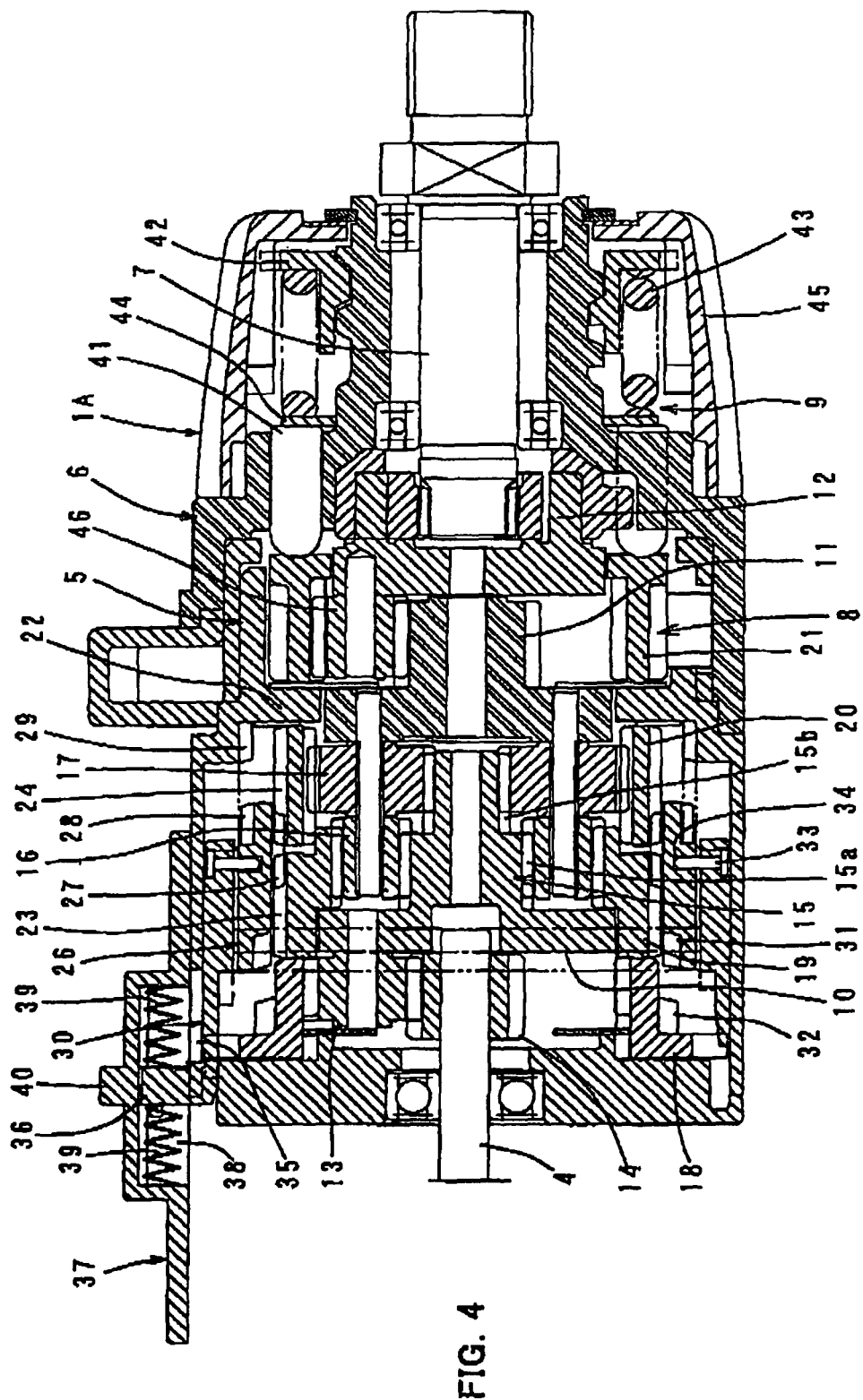
FIG. 4 is a sectional view showing the essential part of the driver drill in the state in which the planetary gear reducing mechanism is shifted to third gear (high speed).

A representative embodiment of the present invention is now described in details with reference to FIGS. 1 to 4. FIG. 1 is a sectional view showing an entire battery-powered driver drill 1 as a representative example of a power tool according to the embodiment of the present invention. FIGS. 2 to 4 are sectional views each showing an essential part of the driver drill Specifically, FIG. 2 shows the state in which a planetary gear reducing mechanism is shifted to first gear (low speed). FIG. 3 shows the state in which the planetary gear reducing mechanism is shifted to second gear (medium speed). FIG. 4 shows the state in which the planetary gear reducing mechanism is shifted to third gear (high speed). As shown in FIG. 1, the driver drill 1 according to this embodiment mainly includes a body 1A, a bit holding chuck 1C disposed in a front end region of the body 1A (on the right side as viewed in FIG. 1) and a handgrip 1B that is connected to the body 1A and designed to be held by a user. Further, the handgrip 1B extends in a direction that intersects with a longitudinal direction of the body 1A. A battery case 25 is mounted on the extending end of the handgrip 1B and houses a battery for powering a motor 3.

The body 1A mainly includes a housing 2 that houses the motor 3, a first gear case 5 having a multi-tier cylindrical shape and disposed in the front region of the housing 2 (on the right side as viewed in FIG. 1), and a second gear case 6 that is disposed forward of the first gear case 5 and rotatably supports a spindle 7. The housing 2, the first gear case 5 and the second gear case 6 are fixedly connected to each other. The body 1A is a feature that corresponds to the "tool body" according to the present invention. A planetary gear reducing mechanism 8 is disposed within the both gear cases 5, 6, and a clutch mechanism 9 is disposed in the front region of the second gear case 6. The planetary gear reducing mechanism 8 is a feature that corresponds to the "speed changing mechanism" according to the present invention.

As shown in FIGS. 2 to 4, the planetary gear reducing mechanism 8 includes first to third carriers 10, 11, 12 disposed in series in the axial direction (longitudinal direction) and each supporting three or four planetary gears on the rear surface side. A planetary gear 13 of the first carrier 10 is engaged with a pinion 14 fitted on an output shaft 4 of the motor 3 and the third carrier 12 is integrally connected to the spindle 7, so that torque of the output shaft 4 can be reduced and transmitted to the spindle 7. The chuck 1C is mounted onto a tip end of the spindle 7 and detachably holds a tool bid such as a driver bid and a drill bid.

An output shaft 15 of the first carrier 10 has a rear large-diameter gear 15a and a front small-diameter gear 15b. The planetary gears that engage with the large-diameter and small-diameter gears 15a, 15b are also formed by two gears having different diameters, a front small gear 16 and a rear large gear 17. Each of the small and large gears 16, 17 is coaxially supported onto the second carrier 11 in such a manner as to be independently rotatable. The small gear 16 and the large gear 17 engage with the large-diameter gear 15a and the small-diameter gear 15b of the output shaft 15, respectively. Therefore, internal gears in the second tier from the rear are also disposed in series as one set in the longitudinal direction This internal gear set comprises a second internal gear 19 in which the small gear 16 revolves (in a first internal gear 18 in the first tier from the rear, the planetary gear 13 of the first carrier 10 revolves) and a third internal gear 20 in which the large gear 17 revolves. Further, the internal gears 18,19,20 have internal teeth on the inner circumference and engage with the planetary gears 13,16,17, respectively.

The output shaft 15 of the first carrier 10 that has the huge-diameter and small-diameter gears 15a, 15b is a feature that corresponds to the "sun gear" according to the present invention. The small- and large-diameter gears 15b, 15a are features that correspond to the "first sun gear of a first gear train" and the "second sun gear of a second gear train", respectively, according to the present invention. Further, the small-diameter gear 15b, the large gear 17 that engages with the small-diameter gear 15b, and the third internal gear 20 that engages with the large gear 17 form the "first gear train" according to the present invention. The large-diameter gear 15a, the small gear 16 that engages with the large-diameter gear 15a, and the second internal gear 19 that engages with the small gear 16 form the "second gear train" according to the present invention. Further, the third and second internal gears 20,19 are features that correspond to the "first internal gear of the first gear train" and the "second internal gear of the second gear train", respectively, according to the present invention.

The second and third internal gears 19, 20 have the same outside diameter as the first internal gear 18. The second and third internal gears 19,20 are disposed between an inner wall 22 of the first gear case 5 and the first internal gear 18 such that they are locked against longitudinal movement and can rotate independently. Further, the same numbers of external teeth 23, 24 having the same shape are formed on the outer circumferential surface of the second and third internal gears 19,20.

A switching member in the form of a switching sleeve 26 is disposed on the outside of the second and third internal gears 19,20. The switching sleeve 26 is fitted on the second and third internal gears 19, 20 in such a manner as to be rotatable and movable in the axial direction (longitudinal direction). Internal teeth 27 are formed on the inner circumferential surface of a front portion of the switching sleeve 26 over a predetermined region extending in the axial direction and can engage with the external teeth 23,24 of the second and third internal gears 19,20. Further, external teeth 28 are formed on the outer circumferential surface of the front end portion of the switching sleeve 26. Large-diameter internal teeth 31 having a larger diameter than the internal teeth 27 are formed on the inner circumference surface of me rear end portion of the switching sleeve 26. The switching sleeve 26 is prevented from rotating when the external teeth 28 engage with engagement teeth 29 formed in the inner circumferential surface of the first gear case 5 and extending in the axial direction, or when the large-diameter internal teeth 31 engage with engagement teeth 32 formed on the outer circumferential surface of the first internal gear 18, by the axial movement of the switching sleeve 26. The switching sleeve 26 is allowed to rotate when both of the external teeth 28 and the internal teeth 31 are disengaged from the respective engagement teeth 29,32. Further, the first internal gear 18 is fixed to the first gear case 5.

A connecting member in the form of a connecting sleeve 30 has a larger diameter than the switching sleeve 26 and is fitted on the rear portion of the switching sleeve 26 within the first gear case 5. Four protrusions (not shown) are formed on the outer circumferential surface of the connecting sleeve 30 and extends in the axial direction, and recessed grooves (not shown) are formed in the inner surface of the first gear case 5. By engagement of the protrusions and the grooves, the connecting sleeve 30 is prevented from rotating and allowed to move in the axial direction. Four pins 33 are provided in the front end portion of the connecting sleeve 30 and spaced at regular intervals in the circumferential direction and extend toward the center in the radial direction. A ring groove 34 is formed generally in the middle of the outer circumferential surface of the switching sleeve 26 and extends in the circumferential direction. The extending end of each of the pins 33 is inserted into the ring groove 34, so that the switching sleeve 26 can move together with the connecting sleeve 30 in the axial direction, while being allowed to rotate. Specifically, the switching sleeve 26 is connected to the connecting sleeve 30 such that the switching sleeve 26 is allowed to move in the circumferential direction with respect to the connecting sleeve 30 and prevented from moving in the axial direction with respect to the connecting sleeve 30.

Further, in the stroke of travel of the connecting sleeve 30 and the switching sleeve 26, the front end sliding position in which the front end of the connecting sleeve 30 contacts the inner wall 22 of the first gear case 5 is a first gear position (see FIG. 2). The front end sliding position and the first gear are features that correspond to the "first speed change position" and the "first speed", respectively, according to the present invention. In this first gear position, the internal teeth 27 of the switching sleeve 26 engage only with the external teem 24 of the third internal gear 20, and the external teeth 28 engage with the engagement teeth 29 of the first gear case 5. The large-diameter internal teeth 31 are disengaged from the engagement teeth 32 of the first internal gear 18. The rear end sliding position in which the rear end of the switching sleeve 26 contacts the first internal gear 18 is a second gear position (see FIG. 3). The rear end sliding position and the second gear are features that correspond to the "second speed change position" and the "second speed", respectively, according to the present invention. In this second gear position, the internal teeth 27 of the switching sleeve 26 engage only with the external teeth 23 of the second internal gear 19, and the large-diameter internal teeth 31 engage with the engagement teeth 32 of the first internal gear 18. The external teeth 28 are disengaged from the engagement teeth 29 of the first gear case 5. Further, in the intermediate sliding position between the first and second gear positions, the internal teeth 27 of the switching sleeve 26 lie astride and engage with the external teeth 23 of the second internal gear 19 and the external teeth 24 of the third internal gear 20 at the same time. The external teeth 28 and the large-diameter internal teeth 31 are disengaged from the engagement teeth 29 of the first gear case 5 and the engagement teeth 32 of the first internal gear 18, respectively (see FIG. 4). The intermediate sliding position and the third gear are features that correspond to the "third speed change position" and the "third speed", respectively, according to the present invention.

Further, a connecting projection 36 is formed on the upper surface of the rear end portion of the connecting sleeve 30 and extends through a slit 35 formed in the rear end portion of the first gear case 5 and extending in the axial direction. The connecting projection 36 is connected to a sliding member in the form of a slide plate 37. The slide plate 37 is provided on the housing 2 in such a manner as to be slidable in the longitudinal direction. The connecting projection 36 is inserted into a recessed portion 38 formed in the underside of the slide plate 37. This connecting projection 36 is placed and supported between front and rear coil springs 39, so that the connecting projection 36 is connected to the slide plate 37. The connecting sleeve 30 and the switching sleeve 26 can be operated by the user from the outside of the housing 2 so as to be moved in the longitudinal direction. Specifically, the user holds an operating projection 40 formed on the upper surface of the slide plate 37 and moves the slide plate 37 in the longitudinal direction. The switching sleeve 26, the connecting sleeve 30 and the slide plate 37 form a switching means. This switching means is a feature that corresponds to the "speed changing part" according to the present invention.

Next, a clutch mechanism 9 is explained. A fourth internal gear 21 placed in the third tier from the rear is rotatably disposed within the second gear case 6. A plurality of pins 41 extend through the second gear case 6 in the axial direction and contacts the front surface of the fourth internal gear 21. The pins 41 are biased rearward via a washer 44 by a coil spring 43. The coil spring 43 is disposed between the pins 41 and a spring holder 42 that is threadably mounted on the second gear case 6. Therefore, the fourth internal gear 21 is engaged with the pin 41 biased by the coil spring 43 and thereby prevented from rotating. Specifically, when load on the spindle 7 increases, for example, upon completion of screw tightening operation and exceeds a clutch actuation torque defined by biasing of the coil spring 43, the pins 41 are caused to ride over the front surface of the fourth internal gear 21 and the fourth internal gear 21 idles. As a result, torque transmission to the spindle 7 is prevented ("driver mode").

Further, a change ring 45 is mounted on the outside of the second gear case 6 and can be turned by the user to threadably move the spring holder 42 in the axial direction. By thus moving the spring holder 42 by turning the change ring 45, the biasing force of the coil spring 43 can be changed to adjust the clutch actuation torque in driver mode.

Operation of the driver drill 1 having such a construction as described above is explained. When the slide plate 37 is slid to the first gear position shown in FIG. 2 using the operating projection 40, as described above, the connecting sleeve 30 and the switching sleeve 26 move to the forward position. The switching sleeve 26 is then engaged with the first gear case 5 and the third internal gear 20. Therefore, the second internal gear 19 is rendered free (allowed to rotate) and the third internal gear 20 is locked. As a result, when the motor 3 is driven in this state, rotation of the output shaft 4 is transmitted from the pinion 14 to the first carrier 10. However, the small gear 16 of the planetary gears that engage with the output shaft 15 of the first carrier 10 is disposed within the second internal gear 19 which is rendered free. Therefore, the large gear 17 within the locked third internal gear 20 is caused to revolve, and the second carrier 11 is caused to rotate in synchronization with the revolution. Subsequently, the second carrier 11 is caused to rotate the third carrier 12 via the planetary gear 46 located in the next tier and thus rotate the spindle 7 that is integrally connected to the third carrier 12. In this manner, in the first gear position, torque is transmitted to the second carrier 11 via the large gear 17. At this time, the spindle 7 rotates at low speed, or a speed based on the speed reduction ratio that is defined by the numbers of the teeth of the small-diameter gear 15b of the output shaft 15 and the third internal gear 20.

Next, when the slide plate 37 is slid to the second gear position shown in FIG. 3, as described above, the connecting sleeve 30 and the switching sleeve 26 move to the rear end position. The switching sleeve 26 is then engaged with the first internal gear 18 and the second internal gear 19. Therefore, the third internal gear 20 is allowed to rotate and the second internal gear 19 is locked. As a result, when the motor 3 is driven in this state, the output shaft 15 of the first carrier 10 causes the small gear 16 to revolve within the second internal gear 19 and causes the second carrier 11 to rotate in synchronization with this revolution. In this manner, in the second gear position, torque is transmitted to the second carrier 11 via the small gear 16. Subsequent torque transmission from the second carrier 11 is the same as in the first gear position. However, the spindle 7 rotates at medium speed faster than the low speed, or a speed based on the speed reduction ratio that is defined by the numbers of the teeth of the large-diameter gear 15a of the output shaft 15 and the second internal gear 19.

Further, when the slide plate 37 is slid to the third gear position shown in FIG. 4, as described above, the connecting sleeve 30 and the switching sleeve 26 move to the intermediate position. The switching sleeve 26 is then engaged with both of the second internal gear 19 and the third internal gear 20 and disengaged from both of the engagement teeth 29, 32 of the first gear case 5 and the first internal gear 18. Therefore, the second and third internal gears 19, 20 are allowed to rotate and integrated with each other in the circumferential direction, so that the first carrier 10 and the second carrier 11 are directly connected. As a result, when the motor 3 is driven in this state, the first carrier 10 and the second carrier 11 rotate at the same speed. Subsequent torque transmission from the second carrier 11 is the same as in the second gear position, However, in this position, speed reduction is not caused between the first carrier 10 and the second carrier 11, so that the spindle 7 rotates at high speed According to this embodiment, rotation of the second and third internal gears 19, 20 can be individually controlled. Further, by provision of the switching means that connects the second internal gear 19 and the third internal gear 20 such that the internal gears can rotate together, three speeds can be realized simply by shifting the engagement between the second and third internal gears 19, 20 without sliding the internal gears 18 to 21. Therefore, the number of parts can be reduced as a whole, and thus the manufacturing costs and assembling labors can be reduced and reliable shifting can also be expected. Particularly, three speeds can be realized by provision of only one-tier gear set that includes the one carrier 11 and the two internal gears 19, 20 which support two front and rear planetary gears. There fore, the number of gear sets can be reduced, and the construction can be effectively simplified.

Further, the switching means is formed by using the switching sleeve 26 which can be selectively placed in three sliding positions by operating the slide plate 37. With this construction, the speed can be selected by simple longitudinal movement of the slide plate 37 (the switching sleeve 26), so that higher operability can be realized. Further, the planetary gear reducing mechanism 8 is disposed in an earlier tier than the clutch mechanism 9 in terms of torque transmission. Therefor, a clutch actuation torque setting can be prevented from fluctuating due to the shifting operation of the planetary gear reducing mechanism 8. Thus, ease of use can also be effectively enhanced.

Further, he switching sleeve 26 is connected to the slide plate 37 via the connecting sleeve 30 that is elastically supported by the coil spring 39. With this construction, the switching sleeve 26 can smoothly engage with the second and third internal gears 19,20, or the first gear case 5 and the first internal gear 18 by its sliding movement In a construction in which the rotational speed of the spindle 7 is changed in three levels by using the planetary gear reducing mechanism 8 including a plurality of planetary gears, it is desired to minimize the outside diameter of each of the internal gears in order to realize reduction in size of the driver drill 1. In order to meet such a demand, it is difficult to provide a large difference between the speed reduction ratio in first gear (at low speed) which is defined by the numbers of the teeth of the small-diameter gear 15b of the output shaft 15 and the third internal gear 20, and the speed reduction ratio in second gear (at medium speed) which is defined by the numbers of the teeth of the large-diameter gear 15a of the output shaft 15 and the second internal gear 19. Specifically, it is difficult to provide a large difference between the speed of rotation at low speed and the speed of rotation at medium speed. On the other hand, it is easy to provide a large difference between the speed of rotation at medium speed and the speed of rotation in third gear (at high speed). Therefore, in actual screw tightening or drilling operation by using the driver drill 1, the frequency of shifting from low speed to medium speed or from medium speed to low speed is extremely lower than the frequency of shifting from low speed to high speed or from medium speed to high speed.

According to this embodiment, the third gear position in which the spindle 7 is rotated at high speed is located in an intermediate position in the direction of sliding operation of the slide plate 37. And the first gear position in which the spindle 7 is rotated at low speed is located forward of the intermediate position, and the second gear position in which the spindle 7 is rotated at medium speed is boated rearward of the intermediate position. With this construction, during processing operation by using the driver drill 1, shifting operation between low speed and high speed which is frequently performed can be done without the need to go through the medium speed area each time. Further, shifting operation between medium speed and high speed which is also frequently performed can be done without the need to go through the low speed area. Therefore, shifting operation can be facilitated, so that ease of use can be improved.

Further, in this embodiment, when the switching sleeve 26 is slid to the front sliding position, the external teeth 28 in the form of the engagement portion formed on the outer circumferential surface of the front end portion of the switching sleeve 26 engage with the engagement teeth 29 of the first gear case 5, so that the third internal gear 20 is locked to the first gear case 5. When the switching sleeve 26 is slid to the rear sliding position, the large-diameter internal teeth 31 in the form of the engagement portion formed on the inner circumferential surface of the rear end portion of the switching sleeve 26 engage with the engagement teeth 32 of the first internal gear 18, so that the third internal gear 20 is locked to the first gear case 5. As a result, the switching sleeve 26 can be connected to the connecting sleeve 30 by the pins 33 at a connecting point formed in the intermediate position of the switching sleeve 26 in the sliding direction. With this construction, shifting operation can be smoothly performed without strongly pushing the switching sleeve 26.

Further, in this embodiment, the switching means is provided on the three-tiered planetary gear reducing mechanism 8. However, the switching means can be applied if one-tier gear set is provided which is formed by the two internal gears 19, 20 and the carrier 11 for supporting the front and rear planetary gears. Therefore, a planetary gear reducing mechanism having a two-tier or even only one-tire gear set can also be applied. For example, in order to provide a planetary gear reducing mechanism having a one-tier gear set, the output shaft 15 of the first carrier 10, or a sun gear having the large-diameter gear 15a and the small-diameter gear 15b may be provided, in place of the pinion 14, on the output shaft 4 of the motor 3.

Further, in this embodiment, the driver drill 1 is explained as a representative example of the power tool, but the present invention can also be applied to other power tools, such as an electric driver and an electric drill, which perform a predetermined operation by rotating a tool bit about its axis.

DESCRIPTION OF NUMERALS

1 driver drill
1A body
1B handgrip 1C chuck
2 housing
3 motor
4 output shaft
5 first gear case
6 second gear case
7 spindle
8 planetary gear reducing mechanism
9 clutch mechanism
10 first carrier
11 second carrier
12 third carrier
13 planetary gear
14 pinion
15 output shaft
15a large-diameter gear
15b small-diameter gear
16 small gear
17 large gear
18 first internal gear
19 second internal gear
20 third internal gear
21 fourth internal gear
22 inner wall
23 external teeth
24 external teeth
25 battery case
26 switching sleeve
27 internal teeth
28 external teeth
29 engagement teeth
30 connecting sleeve
31 large-diameter internal teeth
32 engagement teeth
33 pin
34 ring groove
35 slit
36 connecting projection
37 slide plate
38 recessed portion
39 coil spring
40 operating projection
41 pin
42 spring holder
43 coil spring
44 washer
45 change ring
46 planetary gear

What we claim is:

1. A power tool, including:
a motor that is housed within a tool body,
a spindle that is rotatably disposed in a front end region of the tool body, and
a speed changing mechanism that is disposed between an output shaft of the motor and the spindle and serves to change the rotational speed of the output shaft and transmit the rotational speed to the spindle, the speed changing mechanism including:
first and second gear trains each having one set of a sun gear that is rotated by the output shaft, a planetary gear that engages with the sun gear and can revolve while rotating and an internal gear that engages with the planetary gear and can rotate on the sun gear, and
a carrier that is connected to the spindle and rotatably supports a first planetary gear of the first gear train and a second planetary gear of the second gear train, characterized in that:
the power tool comprises a speed changing part that is slid in the longitudinal direction of the tool body by a user from the outside of the tool body, wherein:
the speed changing part can move among first to third speed change positions, wherein, in the first speed change position, the speed changing part locks a first internal gear of the first gear train to the tool body and thus prevents the first internal gear from rotating, while allowing a second internal gear of the second gear train to rotate without locking the second internal gear to the tool body,
in the second speed change position, the speed changing part locks the second internal gear to the tool body and thus prevents the second internal gear from rotating, while allowing the first internal gear to rotate without locking the first internal gear to the tool body, and
in the third speed change position, the speed changing part connects the first and second internal gears together and allows the first and second internal gears to rotate together without locking the first and second internal gears to the tool body,
in the first and third speed change positions, the second internal gear contacts a third internal gear, and the second internal gear is configured to be disengaged from teeth of the third internal gear,
when the speed changing part is placed in the first speed change position, the carrier is rotated at a predetermined first speed which is defined by a speed reduction ratio of the first gear train,
when the speed changing part is placed in the second speed change position, the carrier is rotated at a predetermined second speed which is defined by a speed reduction ratio of the second gear train and is faster than the first speed,
when the speed changing part is placed in the third speed change position, the carrier is rotated together with the first and second sun gears at a predetermined third speed faster than the second speed, and
the first speed change position is located on one end side in the sliding direction of the speed changing part; the second speed change position is located on the other end side, and the third speed change position is located in an intermediate position between the first and second speed change positions.

2. The power tool as defined in claim 1, wherein:
the rotational speed of the carrier is set such that the speed difference between the first and second speeds is smaller than the speed difference between the second and third speeds.

3. The power tool as defined in claim 1, wherein:
the speed changing part includes a sliding member that is disposed on the outside of the tool body and can be slid by the user, and a switching member that is disposed on the outside of the first and second internal gears in such a manner as to be rotatable and movable in the axial direction, the switching member being connected to the sliding member such that the switching member is allowed to move in the circumferential direction with respect to the sliding member and prevented from moving in the axial direction with respect to the sliding member, and
engagement portions are provided on both end portions of the switching member in the direction of travel and can engage with the tool body, and one or the other of the engagement portions engages with the tool body, thereby preventing the first internal gear or the second internal gear from rotating, and the switching member is connected to the sliding member at a connecting point formed in an intermediate position of the switching member in the direction of travel.

4. The power tool as defined in claim 1, wherein the power tool is defined by a driver drill.

5. A power tool, including:

a motor that is housed within a tool body, a spindle that is rotatably disposed in a front end region of the tool body, and a speed changing mechanism that is disposed between an output shaft of the motor and the spindle and serves to change the rotational speed of the output shaft and transmit the rotational speed to the spindle, the speed changing mechanism including:

first and second gear trains each having one set of a sun gear that is rotated by the output shaft, a planetary gear that engages with the sun gear and can revolve while rotating and an internal gear that engages with the planetary gear and can rotate on the sun gear, and a carrier that is connected to the spindle and rotatably supports a first planetary gear of the first gear train and a second planetary gear of the second gear train, characterized in that:

the power tool comprises a speed changing part that is slid in the longitudinal direction of the tool body by a user from the outside of the tool body, wherein:

the speed changing part can move among first to third speed change positions, wherein, in the first speed change position, the speed changing part locks a first internal gear of the first gear train to the tool body and thus prevents the first internal gear from rotating, while allowing a second internal gear of the second gear train to rotate without locking the second internal gear to the tool body, in the second speed change position, the speed changing part locks the second internal gear to the tool body and thus prevents the second internal gear from rotating, while allowing the first internal gear to rotate without locking the first internal gear to the tool body, and in the third speed change position, the speed changing part directly connects the first and second internal gears together and allows the first and second internal gears to rotate together without locking the first and second internal gears to the tool body, when the speed changing part is placed in the first speed change position, the carrier is rotated at a predetermined first speed which is defined by a speed reduction ratio of the first gear train, when the speed changing part is placed in the second speed change position, the carrier is rotated at a predetermined second speed which is defined by a speed reduction ratio of the second gear train and is faster than the first speed, when the speed changing part is placed in the third speed change position, the carrier is rotated together with the first and second sun gears at a predetermined third speed faster than the second speed, and the first speed change position is located on one end side in the sliding direction of the speed changing part, the second speed change position is located on the other end side, and the third speed change position is located in an intermediate position between the first and second speed change positions.

* * * * *